Jan. 2, 1968  D. J. LESLIE  3,361,082
MODEL TRAIN CONTROL SYSTEM
Original Filed June 11, 1962  3 Sheets-Sheet 1
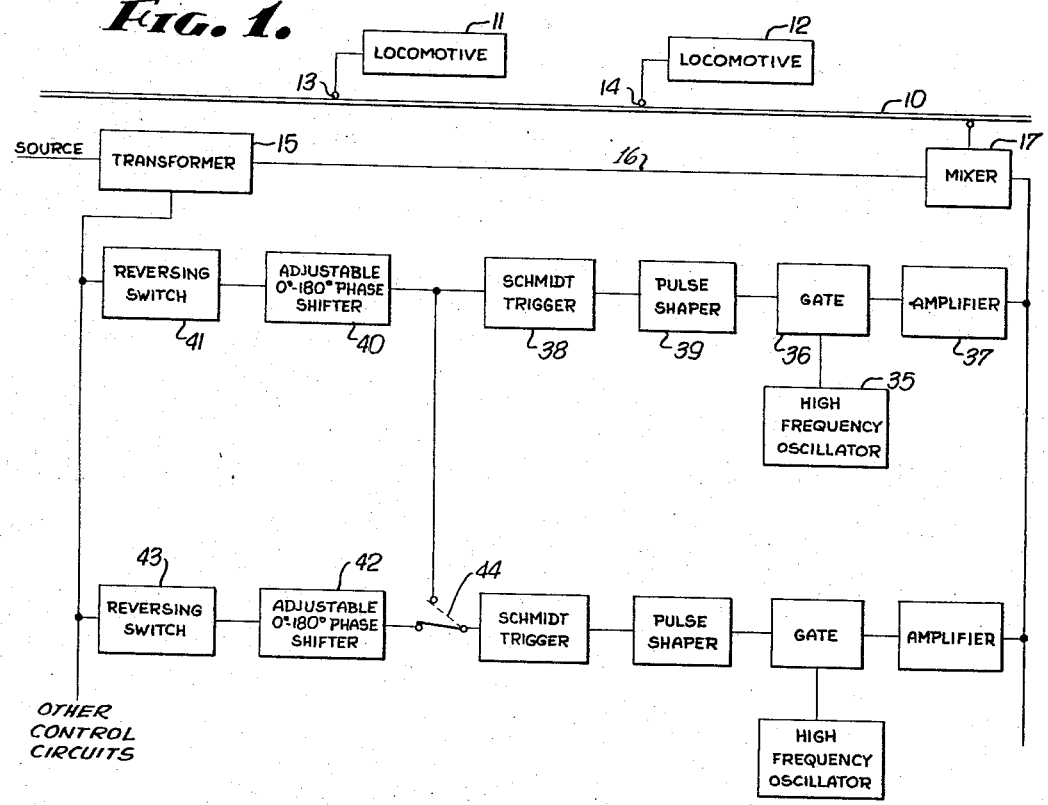
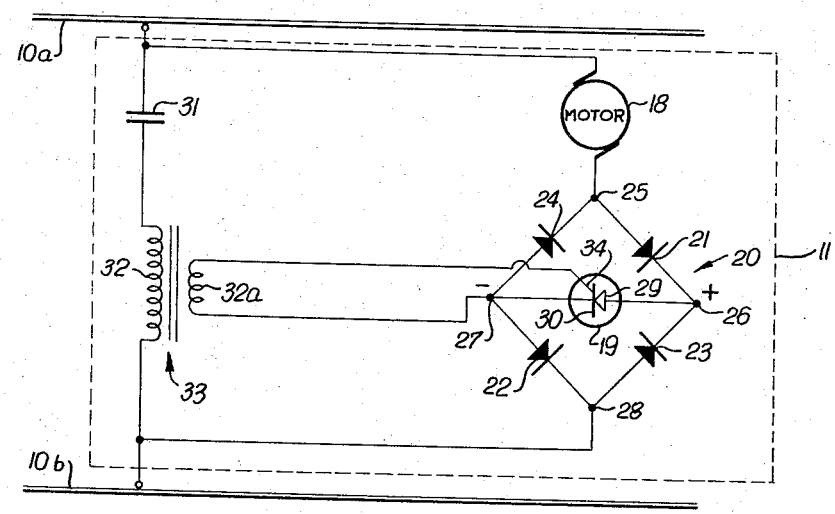
INVENTOR.
DONALD J. LESLIE
BY
Flam and Flam
ATTORNEYS.

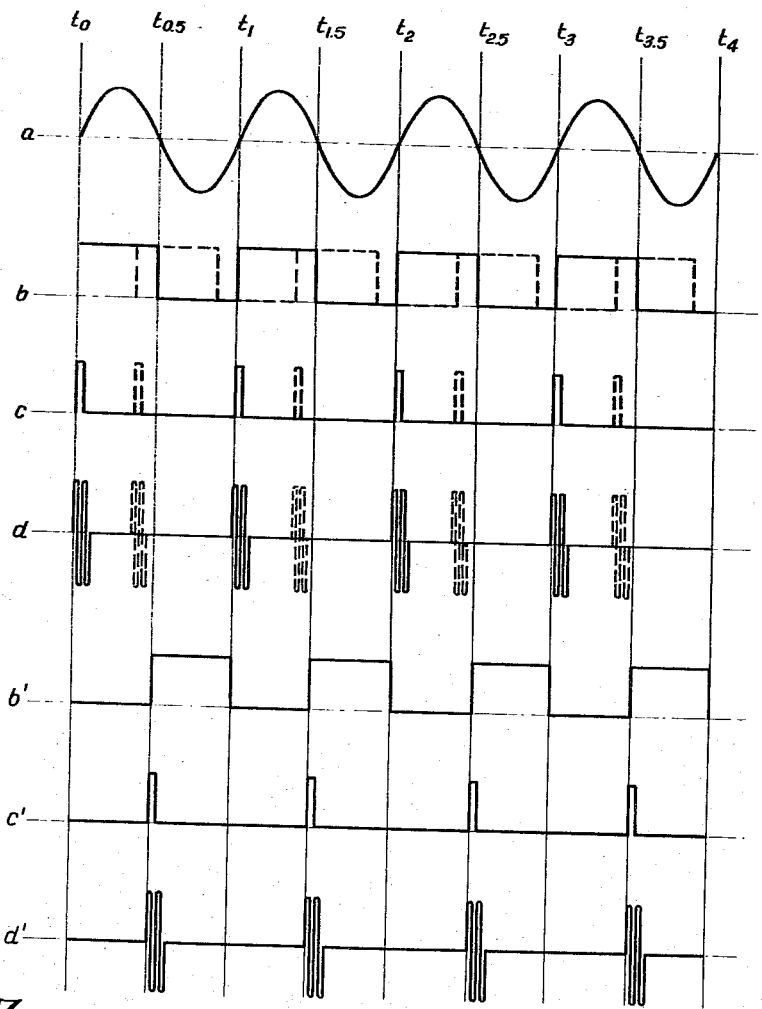
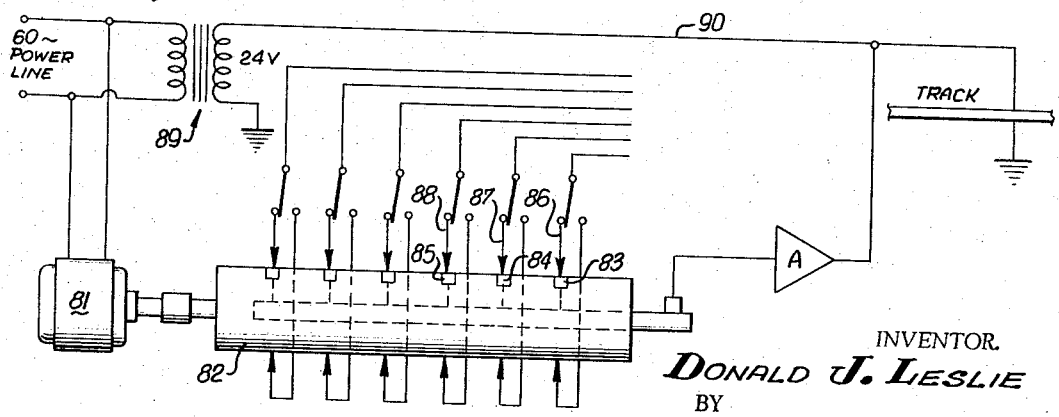

Jan. 2, 1968  D. J. LESLIE  3,361,082
MODEL TRAIN CONTROL SYSTEM
Original Filed June 11, 1962  3 Sheets-Sheet 3
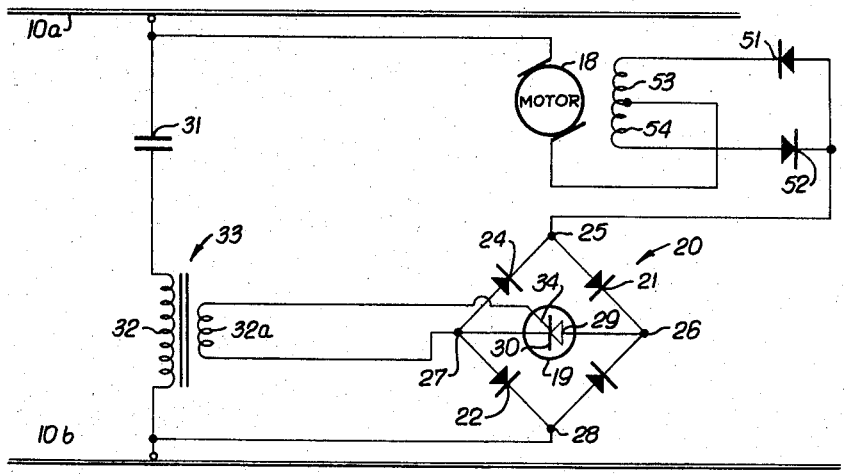
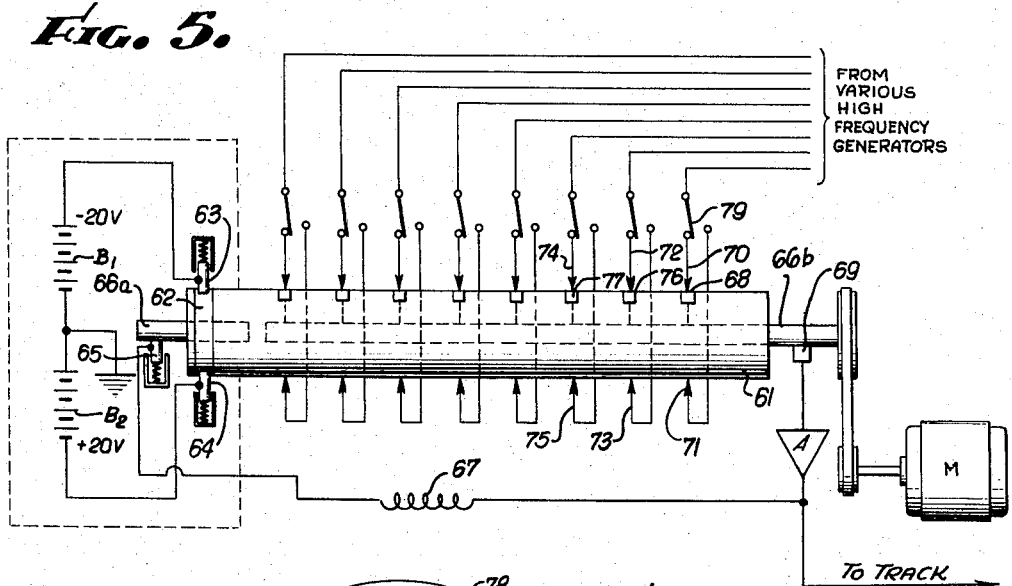
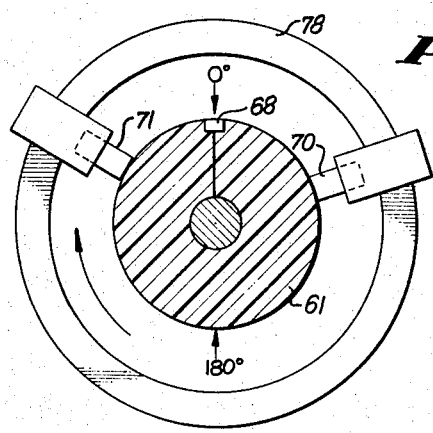
INVENTOR.
DONALD J. LESLIE
BY
Flam and Flam
ATTORNEYS.

United States Patent Office 3,361,082
Patented Jan. 2, 1968

3,361,082
MODEL TRAIN CONTROL SYSTEM
Donald J. Leslie, Altadena, Calif. (267 S. Fair Oaks Ave., Pasadena, Calif. 91105)
Continuation of application Ser. No. 201,343, June 11, 1962. This application July 11, 1966, Ser. No. 564,323
12 Claims. (Cl. 104—151)

ABSTRACT OF THE DISCLOSURE

Vehicles 11, 12, etc., are guided for independent movement along a track system 10. Alternating current is applied to the track. Each vehicle (FIG. 2) has a polarity responsive motor 18 for driving the corresponding vehicle at a speed corresponding to the intensity of energization and in a direction determined by th polarity of the source voltage. A switch means 19 carried by the vehicle is serially associated with the motor 18 for completing a circuit across the tracks. The switch means 19 is controlled by a coded high frequency signal from an oscillator 35 (FIG. 1). A tuned circuit 31, 33 (FIG. 2) picks up the coded signal and operates the switch means 19. At the end of the half cycle, current cuts off. The generator 35 (FIG. 1) is gated so that it recurs once each full cycle whereby its phase angle determines both speed and direction of the vehicle.

---

This is a continuation of application Ser. No. 201,343, filed June 11, 1962.

This invention relates to model railways.

The primary object of this invention is to provide a simple system for separately controlling the speed and direction of movement of several locomotives or other vehicles deriving power from the same track.

Another object of this invention is to make it possible for auxiliary equipment carried on the locomotive or train to be operated from the track independently of the operation of the locomotive motor and independently of the position or motion of the locomotive on the track. For example, car uncouplers, locomotive horns, door operators, cranes, etc. can be operated wherever the train happens to be.

Another object of this invention is to provide a simplified means for a common speed control as well as separate speed controls of several locomotives. Thus, two locomotives can be brought together at any place, coupled, and then operated in unison.

Still another object of this invention is to provide reliable compact components that can readily be packaged in a small gauge locomotive.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

BRIEF DESCRIPTION OF THE DRAWINGS

FIG. 1 is a block diagram illustrating one embodiment of the present invention;

FIG. 2 is a wiring diagram showing the circuit for a locomotive motor;

FIG. 3 is a wiring diagram similar to FIG. 2, illustrating a circuit for an alternate type of locomotive motor;

FIG. 4 is a chart showing the waveforms produced by the circuit of FIG. 1;

FIG. 5 is a diagram illustrating a second embodiment of the present invention;

FIG. 6 is a transverse sectional view of the commutator shown in FIG. 5 together with associated parts; and FIG. 7 is a diagram similar to FIG. 5, illustrating a third embodiment of the present invention.

DESCRIPTION OF THE PREFERRED EMBODIMENTS

In FIG. 1, there is illustrated by single wire diagram an electrically conductive model railroad track 10. Locomotives 11, 12 and possibly others are mounted upon the track 10 and derive energization therefrom, as indicated by brushes 13 and 14.

For supplying energy to the track 10, a step-down transformer 15 is provided that is powered by a suitable commercial source. The transformer 15 has an output lead 16 that connects to a mixer circuit 17 which, in turn, connects to the track by the aid of a clip or other suitable device.

The locomotive 11 (FIG. 2) includes a reversible or polarity sensitive direct current motor 18. In the present example, the motor may have a permanent magnetic field. However, the D.C. motor 18 is connected to the track conductors 10a and 10b to which alternating current is supplied. The source frequency may be of the order of fifty or sixty cycles per second.

In order for the D.C. motor 18 to utilize the alternating current, a switching device in the form of a silicon controlled rectifier (SCR) 19 is turned on only during alternate halves of the source cycle. Depending upon which haves of the cycle the SCR is turned on, the direct current motor 18 either moves in the forward direction or the reverse direction.

In order serially to couple SCR 19 which is a direct current device into a circuit where current is intended to pass in both directions a full wave bridge circuit 20 is provided. The bridge 20 has diodes 21, 22, 23 and 24 connected relative to input and intermediate terminals 25, 26, 27 and 28. One input terminal 28 of the bridge is connected to track conductor 10b and one motor terminal is connected to the other track conductor 10a while the other input terminal 25 and the other terminal of the motor are connected together. Assuming that track conductor 10a is positive relative to the track conductor 10b, current may flow through the motor 18 if the SCR 19 is on, and as follows: track 10a, motor 18, bridge terminal 25, diode 21, plus bridge terminal 26, SCR anode 29, SCR cathode 30, minus bridge terminal 27, diode 22, bridge terminal 28 to the other track conductor 10b.

If the track conductor 10b is positive relative to the track 10a, current may flow as follows if the SCR is on: track conductor 10b, bridge terminal 28, diode 23, plus bridge terminal 26, SCR anode 29, SCR cathode 30, minus bridge terminal 27, diode 24, bridge terminal 25, motor 18 to the track 10a.

In order to switch the SCR 19 to its on state at selected half cycles, a high frequency pulse is transmitted to the track conductors. The pulse frequency, by way of example, may be in the range of from twenty-five to four hundred kilocycles. A tuned circuit mounted upon the locomotive discriminates against all but a high frequency signal corresponding to the one intended to control the specific SCR 19 and locomotive 11. The tuned circuit includes a capacitor 31 and a primary winding 32 of the suitable transformer 33. A secondary winding 32a of the transformer 33 is connected across the cathode 30 of the SCR 19 and its gate 34. Assuming that the high frequency pulse is of suitable characteristic frequency, gate current is caused to flow in the SCR at a specific time or phase angle in the source cycle. Once turned on, the SCR due to its characteristics stays on for the remainder of the half cycle.

If the phase angle of the high frequency triggering pulse relative to the source cycle is slightly more than 0°, then the motor 18 will be connected to the source substantially for the entire positive half cycle and the average voltage will be at a maximum. The motor 18 will operate at maximum speed in one direction. As the phase angle of the pulse approaches 180°, the SCR 19 allows the source voltage to be applied to the motor 18 for lesser periods of time and the average voltage is much reduced. The speed of the motor 18 is correspondingly reduced but the direction of travel remains the same.

If the phase angle of the triggering pulse slightly exceeds 180° then the motor will be connected to the source during substantially all of the negative half cycle, and the motor 18 will operate at maximum reverse speed. As the phase angle approaches 360° the motor 18 operates more slowly in the reverse direction.

The circuit for providing the high frequency pulse for the locomotive 18 is shown in block diagram in FIG. 1. A high frequency oscillator 35 is gated by a circuit 36. The resultant output is applied through an amplifier 37 and the mixer 17 to the track 10. In order to provide a suitable gating signal, a Schmitt trigger circuit 38 is provided that is excited by the same source (in this instance the transformer 15) that provides main excitation for the track 10. The Schmitt trigger circuit 38 transforms the sine wave of the source shown at $a$ in FIG. 4 to the square wave form synchronized therewith, and as shown at $b$.

In order to reduce the width of the characteristic Schmitt trigger pulse from 180° to a few degrees, a shaper circuit 39 is provided that is interposed between the gate 36 and the Schmitt trigger circuit 38. Thus, a narrow pulse at $c$ in FIG. 4 is utilized for gating the high frequency oscillator 35. The oscillations as depicted at $d$ in FIG. 4 are passed to the track during the existence of the corresponding pulse. From inspection of FIG. 4 it would appear that the oscillations at $d$ continue after the corresponding pulse subsides. This normally would not be the case, the drawings being exaggerated for purposes of clarity.

In order to control the phase angle at which the high frequency oscillator is gated, a phase shifting device 40 is interposed between the source or transformer 15 and the Schmitt trigger circuit 38. The device 40 may be of any suitable design. It may utilize by way of example a series of phase shift sections each having variable resistors. When the device 40 is adjusted to produce a 0° phase shift, the corresponding SCR will be turned on at the start of the positive half of the cycle, and maximum volt-seconds will be applied to the locomotive resulting in fast forward.

If the device 40 is adjusted to produce, say a 135° phase shift, the Schmitt trigger pulses at $b$, the shaper pulses at $c$, and the oscillator impulses at $d$ are all delayed, as indicated in dotted lines. The volt-seconds applied to the locomotive are derived only from the final 45° of the positive half of the source voltage, and the locomotive operates at slow forward.

In order to switch the high frequency pulses from the positive halves of the cycle to the negative halves of the cycle, a reversing switch 41 is provided. This switch is interposed between the phase shifter 40 and the source or transformer 15. For a 0° phase shift adjustment of the device 40, operation of the switch 41 results in the Schmitt trigger circuit producing the pulses shown at $b'$ in FIG. 4. The shaping circuit and the oscillations are correspondingly timed, as indicated at $c'$ and $d'$. Hence, the corresponding SCR is turned on at the start of the negative half of the source cycle. The result is fast reverse. Adjustment of the phase shafter 40 then effects a reduction in the volt-seconds applied during the negative half of the source cycle, and the result is slow reverse.

Each locomotive has a circuit tuned to a different frequency, and thus for each locomotive there is provided a high frequency generator and associated shapers, trigger circuits, phase shifters and reversing switches. A circuit for the second locomotive 10 is also shown in FIG. 1. Each control circuit has its own phase shifting network, as at 40 and 42 and reversing switch as at 41 and 43. Thus, the speed and direction of each locomotive is separately controlled.

A selector switch 44 can bring locomotive 12 under common control with locomotive 11. Thus the switch substitutes in the control circuit for locomotive 12, the reversing switch and phase shifter of the control circuit for locomotive 11.

The series tuned circuit and including capacitor 31 and transformer 33 effectively isolate each SCR firing circuit from the low frequency source applied to the track conductors. Furthermore, a series tuned circuit, as shown, in place of the other types of tuned circuits, serves to isolate the transformer 33 from the low frequency power supply. The series tuned circuits produce a minimum impedance at their resonant frequencies, thereby performing filtering functions for prevention of interference with other channels or locomotives.

The secondary circuit including the gate of the SCR has little resistive component; hence, the tuning of the circuit as a whole is exceedingly sharp.

In FIG. 3 a universal type motor is illustrated that instead of having a permanent magnetic field is provided with a series field divided into a forward motion producing section and reverse motion producing section. Rectifying diodes 51 and 52 serve to couple the field sections 53 and 54 to the circuit. It will be understood that any type of polarity sensitive motor may be used.

In the form of the invention illustrated in FIG. 5, a mechanical device is utilized for generating the operating power, and mechanical means are provided for controlling the phase angle at which the pilot high frequency signals are generated. A commutator 61 in the form of a cylinder made of insulation material is supported for rotation about its axis, and driven by a motor M. The commutator 61 has a conductive arcuate segment 62 that cooperates alternately with brushes 63 and 64. The brushes 63 and 64 are connected respectively to negative and positive voltage sources, in this instance, batteries B1 and B2. Accordingly, the arcuate segment 62 is alternately at the minus potential of battery B1 and then at the plus potential at the battery B2. A square wave is thus generated. This voltage is derived by a brush 65 that engages a cylindrical conductor 66a projecting axially from one end of the commutator. The brush 65 connects to the track to provide power for the locomotives through a choke 67.

A contact 68, flush-mounted at the periphery of the commutator, is also connected to the track by the aid of a cylindrical conductor 66b projecting from the other end of the commutator, and a brush 69 that engages the conductor 66b. The contact 68 sweeps past two spaced brushes 70 and 71, one of which is continuously energized by an oscillator corresponding to the oscillator 35 of the form shown in FIG. 1. Accordingly, the contact 68, as it passes the operative brush 70 or 71, transmits to the track a signal from the corresponding high frequency generator. The signal is transmitted only during the relatively short time that the brush is in engagement with the operative contact. Similarly, brushes 72–73, 74–75 are provided for contacts 76, 77, etc., energized by other oscillators for corresponding locomotives.

Each of the contact-engaging brushes is adjustable through an angle of about 180° relative to the axis of the commutator. The contacts 70, for example, is adjustable through an angle corresponding to the positive half of the track excitation, and the contact 71 is adjustable through an angle corresponding to the negative half of the track excitation. Thus, the contact 68 engages the brush 70 between the 0° and 180° position of the commutator, that is, when the track has positive excitation, The contact 68 sweeps past the brush 71 when the track has negative excitation. A mounting ring 78 is provided for the brushes. A selector switch 79 determines which of the brushes 70 or 71 is operative.

By adjusting the operative brush, the phase angle for gating is controlled such that the volt-seconds of energization of the locomotive is determined. Thus, by moving the brush 70 upwardly (FIG. 6) toward the 0° position, and assuming that this brush is operative, more of the positive half cycle of the source is effective to produce motion. Thus, the speed of the corresponding locomotive in the forward direction is determined.

Operation of the selector switch 79 causes the brush 71 to be operative; hence, the locomotive operates during the negative halves of the source cycle, and the locomotive reverses. Adjustment of the brush 71 determines the phase angle of the oscillator impulses, and hence the speed of operation in the reverse direction.

The choke coil 67 prevents the high frequency oscillators from being shorted to ground via the low frequency power supply.

In order to prolong the life of the brushes, the circuits directly controlled thereby may be bases of amplifying transistors. Furthermore, in place of the contacts 68, 76, 77, etc., optical devices could be utilized in conjunction with photosensitive devices, thereby providing phase related signals independently of mechanical means.

In the form of the invention illustrated in FIG. 7, synchronism between the source and the gating contacts is achieved by utilizing a synchronous motor 81 for driving the insulation shaft 82. Spot contacts 83, 84, 85, etc., are mounted on the shaft 82 and engage brushes 86, 87, 88, etc., as in the previous form. A transformer 89 provides excitation for the track lead 90.

I claim:

1. In a model train control system or the like: a track having associated conductive means; source means for applying alternating current to the said conductive means that has alternate half cycles of opposite polarities; a vehicle guided by said track for movement therealong and having brush means; motive means carried by the vehicle and deriving energy from said track associated conductive means by the aid of said brush means, said motive means operating at a speed corresponding to the intensity of energization thereof and being polarity responsive for determining the direction of motion of said vehicle; switch means carried by the vehicle and serially associated with said motive means for allowing passage of current thereto from said conductive means, said switch means having an on state and an off state of operation, and having the characteristic that, if on, it returns to its off state at the end of the corresponding half cycle of said source means, said switch means being controllable by a signal; remote control means for the switch means separate from said vehicle including means synchronized with the source means for producing a signal once each full cycle; sensing means carried by the vehicle and responsive to said signal for determining said on state of operation of said switch means, said control means further including phase shift means for determining the timing of said signal relative to said source means cycle for determining the speed and direction of said vehicle.

2. The combination as set forth in claim 1 in which said switch means comprises controlled rectifier means, and in which a tuned circuit is associated with a gate circuit therefor; said signal comprising a pulse of alternating current of selected frequency much higher than the frequency of said source means.

3. The combination as set forth in claim 1 in which said signal producing means includes an oscillator, a commutator having a rotary contact, a brush engaged by the contact and controlling the operative association between said oscillator and said sensing means, means synchronously associating the movement of said commutator with said alternating current source means; said phase shift means including means for adjusting the operative angular position of said brush relative to said commutator.

4. The combination as set forth in claim 1 in which said signal producing means includes an oscillator, a commutator having a rotary contact, a brush engaged by the contact and controlling the operative association between said oscillator and said sensing means, means synchronously associating the movement of said commutator with said alternating current source means comprising a synchronous motor coupled to said commutator and energized by said source means; said phase shift means including means for adjusting the operative angular position of said brush relative to said commutator.

5. In a model train control system or the like: a track having conductive means; means for energizing said conductive means so that alternating current can be derived therefrom that has alternate half cycles of opposite polarities; a plurality of independently movable vehicles guided by said track for movement therealong and having means cooperable with said conductive means for deriving alternating current therefrom; each vehicle having associated switching means and a polarity sensitive reversible motor controlled by said switching means; said switching means having an on state and an off state of operation, and returning to or remaining in its off state at the end of each half cycle of said source means; means remote from the vehicles for separately and cyclically operating said switching means in synchronism with said alternating current and once each full cycle to control the phase angle and half cycle when the corresponding switching means is switched to its on state to determine the speed and direction of motion of the respective vehicles.

6. In a model train control system or the like: a track having conductive means; means energizing said conductive means so that there can be derived therefrom alternating current that has alternate half cycles of opposite polarities, a vehicle guided by said track for movement therealong and having means cooperable with said conductive means for deriving energy therefrom; a polarity sensitive reversible motor for operating the vehicle; controlled rectifier means for metering the current to said motor and switching from an off state to an on state and having the characteristic that, if on, it returns to its off state at the end of the corresponding half cycle of said alternating current; a circuit carried by the vehicle tuned to a signal of preselected frequency superimposed upon said conductive means for turning said rectifier means on; and means for transmitting pulses of preselected frequency to said conductive means once during each cycle of said alternating current, and in phase controlled synchronism with the cycle of said alternating current to control the speed and direction of said vehicle by said switch means.

7. In a model train control system or the like: a track having conductive means; means energizing said conductive means so that there can be derived therefrom alternating current that has alternate half cycles of opposite polarities; a vehicle guided by said track for movement therealong and having means cooperable with said conductive means for deriving energy therefrom; a polarity sensitive reversible motor for operating the vehicle; controlled rectifier means for metering the current to said motor and switching from an off state to an on state and having the characteristic that, if on, it returns to its off state at the end of the corresponding half cycle of said alternating current; a circuit carried by the vehicle tuned to a signal of preselected frequency superimposed upon said conductive means for turning said rectifier means on; remote control means comprising an oscillator having a frequency to which said circuit is tuned; means operable synchronously with said alternating current cyclically causing said oscillator to be operatively associated with said conductive means; and means for selectively determining the phase angle in the said cycle at which said oscillator is first operatively associated with said conductive means to control the speed and direction of said vehicle by said rectifier means.

8. In a model train control system or the like: a track having conductive means; means energizing said conductive means so that there can be derived therefrom alternating current that has alternate half cycles of opposite polarities; a vehicle guided by said track for movement therealong and having means cooperable with said conductive means for deriving energy therefrom; a polarity sensitive reversible motor for operating the vehicle; a controllable switching device for metering the current to said motor and switching from an off state to an on state and having the characteristic that, if on, it returns to its off state at the end of the corresponding half cycle of said alternating current; a circuit carried by the vehicle tuned to a signal of preselected frequency superimposed upon said conductive means for turning said device on; remote control means comprising an oscillator having a frequency to which said circuit is tuned; means operable synchronously with said alternating current cyclically causing said oscillator to be operatively associated with said conductive means, comprising a trigger circuit synchronized with the cycle of said alternating current; and circuit means for shifting the phase relationship of the synchronized trigger circuit.

9. In a model train control system or the like: a track having conductive means; means energizing said conductive means so that there can be derived therefrom alternating current that has alternate half cycles of opposite polarities; a plurality of vehicles each guided by said track for independent movement along said track, and having means cooperable with said conductive means for deriving energy therefrom; a polarity sensitive reversible motor for each vehicle; a controllable switching device for each motor for metering the current to the corresponding motor and switching from an off state to an on state and having the characteristic that, if on, it returns to its off state at the end of the corresponding half cycle of said alternating current; circuit means carried by each vehicle tuned to an individually selected frequency superimposed upon said conductive means for turning said device on; and remote control means for each vehicle, comprising an oscillator for producing the corresponding individual frequency, means operable synchronously with said alternating current cyclically causing the oscillator to be operatively associated with said conductive means, and means for shifting the phase relationship of the turn-on time of the oscillator.

10. In a system for controlling the speed and direction of travel of a plurality of vehicles in a common path: conductive means extending along said common path; source means for applying alternating current to said conductive means that has alternate half cycles of opposite polarities; a plurality of vehicles; means guiding said vehicles for independent movement along said path; each of said vehicles having
motive means deriving energy from said conductive means, said motive means operating at a speed corresponding to the intensity of energization thereof and being polarity responsive for determining the direction of motion of the corresponding vehicle; a controllable switching device carried by the vehicle and completing an energization circuit for said motive means across said conductive means, said switching device having an on state and an off state of operation, and having the characteristic that, if on, it returns to its off state at the end of the corresponding half cycle of said source means, said switching device being controllable by a signal;
remote control means for the switching device of each vehicle, including
means synchronized with the source means for producing a signal of coded frequency once each full cycle, said control means further including phase shift means for determining the timing of said signal relative to said source means cycle; and
each of said vehicles having sensing means carried thereby and responsive to the corresponding coded frequency signal of said remote control means for determining said on state of operation of said switching device at a selected time during the full cycle of said source means whereby both speed and direction of said vehicle are determined.

11. The combination as set forth in claim 10 in which said switching device is a controlled rectifier having a gate, an anode and a cathode; two pairs of diodes connecting said switching device to said motive means, one diode of one pair being connected between the conductive means and said anode, the other diode of said pair being connected between said cathode and one terminal of said motive means, one diode of said other pair being connected between said conductive means and said cathode, the other diode of said pair being connected between said anode and said one terminal of said motive means, the other terminal of said motive means being connected to said conductive means; one pair of diodes connecting said motive means across said conductive means via said switching device for one polarity of said source means, and said other pair of diodes connecting said motive means across said conductive means via said switching device for the other polarity of said source means.

12. In a model train control system or the like: a track having a conductive means; means energizing said conductive means so that alternating current can be derived therefrom; a plurality of vehicles guided for independent movement along said track, and having means cooperable with said conductive means for deriving energy therefrom; a polarity sensitive reversible motor for each vehicle; a controllable switching device for each motor for metering the current to the corresponding motor; circuit means carried by each vehicle tuned to an individually selected frequency superimposed upon said conductive means for turning said device on; remote control means for each vehicle, comprising an oscillator for producing the corresponding individual frequency, means for causing the oscillator to be operatively associated with said conductive means in synchronism with the cycle of said alternating current and during a fraction of said cycle, and means for shifting the phase relationship of the on time of the oscillator; and means selectively substituting in the circuit means of one of the vehicles the phase shifting means of another of the circuit means whereby a master control for two vehicles is achieved.

References Cited

UNITED STATES PATENTS

| | | | |
|---|---|---|---|
| 2,888,622 | 5/1959 | Mooers. | |
| 2,977,523 | 3/1961 | Cockrell. | |
| 3,202,899 | 8/1965 | Gambill | 318—341 |
| 3,211,111 | 10/1965 | Morley | 104—151 X |

OTHER REFERENCES

IBM: Tech Disclosure Bulletin, by F. K. Allen, vol. 2, No. 5, February 1960, pp. 51–52, titled "Motor Control Circuit."

G. E. Appl. Note, titled "Universal Motors Speed Controls," by F. W. Gurtfwiller, June 1961.

ARTHUR L. LA POINT, *Primary Examiner.*

STANLEY T. KRAWCZEWICZ, *Examiner.*